(12) United States Patent
Chien et al.

(10) Patent No.: US 11,501,641 B2
(45) Date of Patent: Nov. 15, 2022

(54) PARKING MANAGEMENT METHOD AND PARKING MANAGEMENT DEVICE

(71) Applicant: Fulian Precision Electronics (Tianjin) Co., LTD., Tianjin (CN)

(72) Inventors: Yu-Ching Chien, New Taipei (TW); Chuang-Wei Tseng, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 272 days.

(21) Appl. No.: 17/038,181

(22) Filed: Sep. 30, 2020

(65) Prior Publication Data

US 2022/0068134 A1 Mar. 3, 2022

(30) Foreign Application Priority Data

Aug. 31, 2020 (CN) .......................... 202010901041.3

(51) Int. Cl.
| | | |
|---|---|---|
| *B60Q 1/14* | (2006.01) | |
| *G08G 1/14* | (2006.01) | |
| *G07B 15/04* | (2006.01) | |
| *G06T 7/10* | (2017.01) | |
| *G06V 10/44* | (2022.01) | |

(Continued)

(52) U.S. Cl.
CPC ............... *G08G 1/149* (2013.01); *G06T 7/10* (2017.01); *G06V 10/443* (2022.01); *G07B 15/04* (2013.01); *G06T 2207/20084* (2013.01); *G06V 20/625* (2022.01); *G06V 30/10* (2022.01); *G06V 2201/08* (2022.01)

(58) Field of Classification Search
CPC ...... G08G 1/149; G08G 1/005; G08G 1/0116; G08G 1/0175; G08G 1/04; G08G 1/146; G08G 1/148; G06T 7/10; G06T 2207/20084; G06V 10/443; G06V 20/625; G06V 30/10; G06V 2201/08; G06V 10/82; G06V 20/54; G07B 15/04; B60L 2250/16; B60L 53/30; B60L 53/65; G06Q 50/30; G06Q 2240/00; E01F 13/085

See application file for complete search history.

(56) References Cited

U.S. PATENT DOCUMENTS

2016/0125736 A1\* 5/2016 Shaik ................. G01C 21/3407
701/410
2019/0156676 A1\* 5/2019 Moragas Loren ..... G07B 15/02
(Continued)

FOREIGN PATENT DOCUMENTS

| CN | 105468337 A | 4/2016 |
| CN | 205930212 | 2/2017 |

(Continued)

*Primary Examiner* — Dhaval V Patel
(74) *Attorney, Agent, or Firm* — ScienBiziP, P.C.

(57) ABSTRACT

A parking management method includes detecting whether there is a vehicle approaching a parking management device in a parking space, capturing images of the vehicle when the vehicle is detected approaching the parking management device, identifying feature information of the vehicle in the captured images, determining whether the vehicle matches the parking space according to the feature information, controlling a lifting mechanism to change from a raised state to a lowered state when the vehicle matches the parking space, and establishing a pairing connection between the parking management device and a mobile terminal.

18 Claims, 5 Drawing Sheets

(51) Int. Cl.
 *G06V 20/62* (2022.01)
 *G06V 30/10* (2022.01)

(56) References Cited

U.S. PATENT DOCUMENTS

2020/0011671 A1* 1/2020 Puri .................. G01C 21/3691
2020/0349617 A1* 11/2020 Rosas-Maxemin .... G06Q 50/30

FOREIGN PATENT DOCUMENTS

| CN | 107719150 | A |   | 2/2018  |          |          |
|----|-----------|---|---|---------|----------|----------|
| CN | 108172009 |   |   | 6/2018  |          |          |
| CN | 108961441 | A | * | 12/2018 | ............. | G07B 15/02 |
| CN | 108961441 | A |   | 12/2018 |          |          |
| CN | 109874108 |   |   | 6/2019  |          |          |
| CN | 110580822 |   |   | 12/2019 |          |          |

* cited by examiner

PARKING MANAGEMENT METHOD AND PARKING MANAGEMENT DEVICE

FIELD

The subject matter herein generally relates to a parking management method, and more particularly to a parking management method implemented in a parking management device.

BACKGROUND

Nowadays, there are dedicated parking spaces for electric vehicles. However, sometimes the dedicated parking spaces are occupied by unauthorized vehicles, so that charging devices installed in the dedicated parking spaces cannot be effectively used.

BRIEF DESCRIPTION OF THE DRAWINGS

Implementations of the present disclosure will now be described, by way of embodiments, with reference to the attached figures.

DETAILED DESCRIPTION

Figure 1:
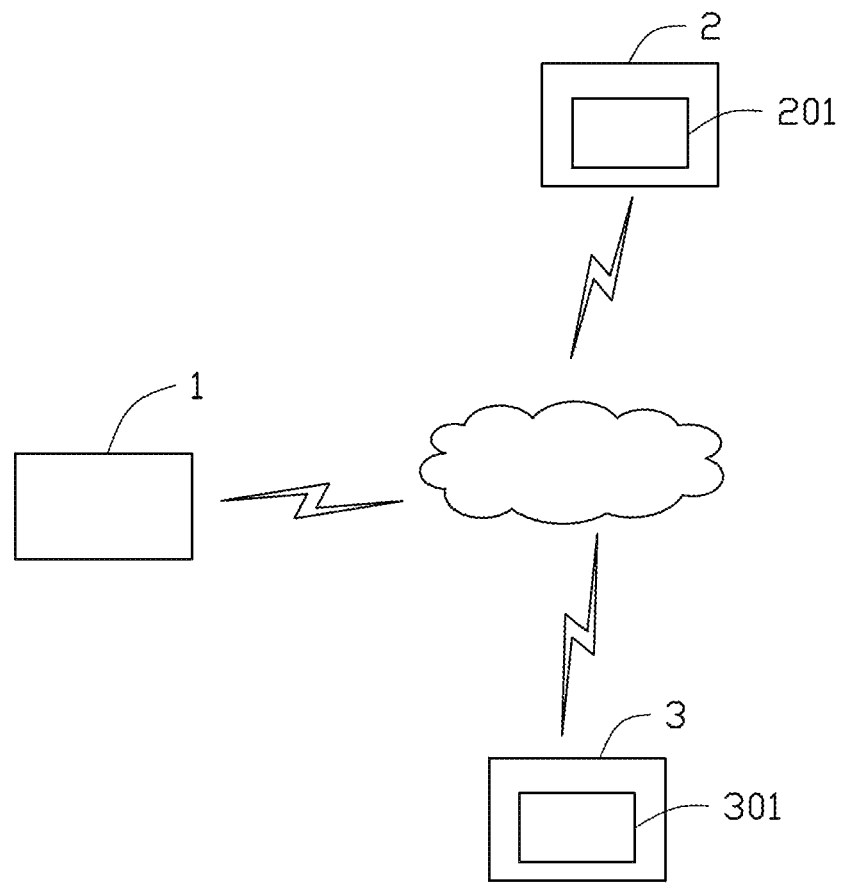
FIG. 1 is a schematic diagram of an application environment architecture of a parking management device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 is a schematic diagram of an application environment architecture of a parking management device 1 provided by an embodiment of the present disclosure.

In one embodiment, the parking management device 1 is installed in a parking space for managing the parking space.

The parking management device 1 can establish a communication connection with a mobile terminal 2 of a vehicle and at least one server 3 through a wireless network. The wireless network may be radio, wireless fidelity (WIFI), cellular, etc.

The mobile terminal 2 may be a smart phone, a tablet computer, a smart watch, etc. The server 3 may be a single server, a server cluster, a cloud server, or the like.

Figure 2:
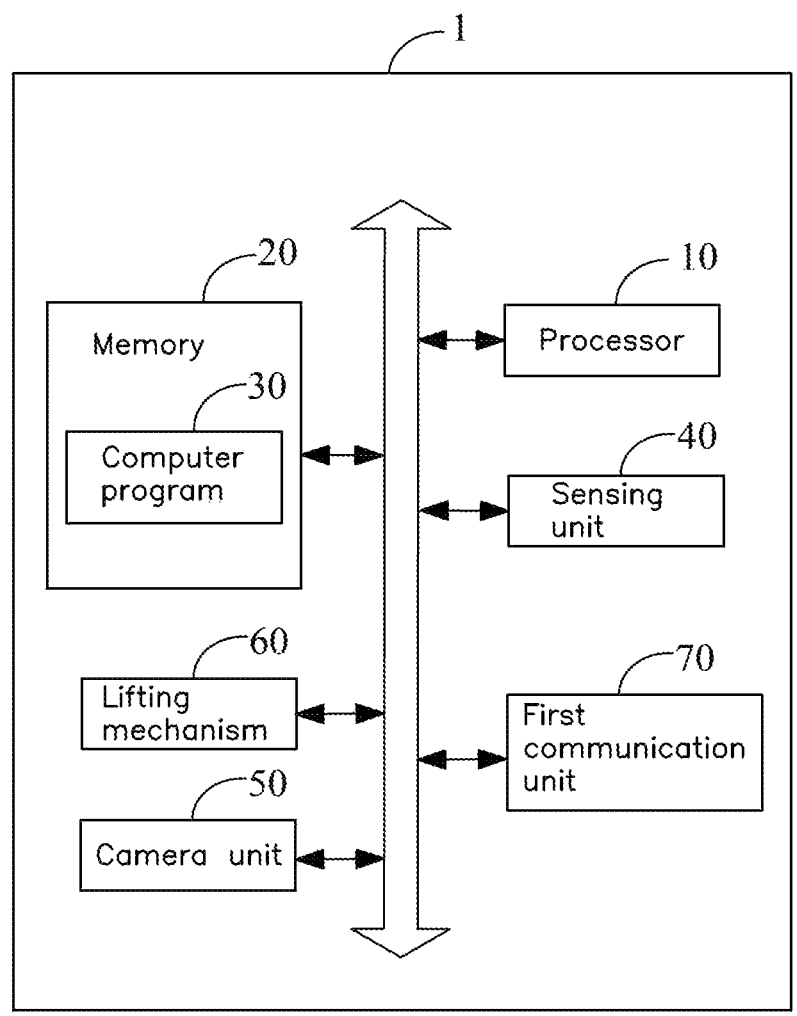
FIG. 2 is a schematic block diagram of the parking management device.

FIG. 2 is a schematic structural diagram of the parking management device 1.

The parking management device 1 includes, but is not limited to, a processor 10, a memory 20, a computer program 30 stored in the memory 20 and executable by the processor 10, a sensing unit 40, a camera unit 50, a lifting mechanism 60, and a first communication unit 70. For example, the computer program 30 may be a parking management program.

Figure 4:
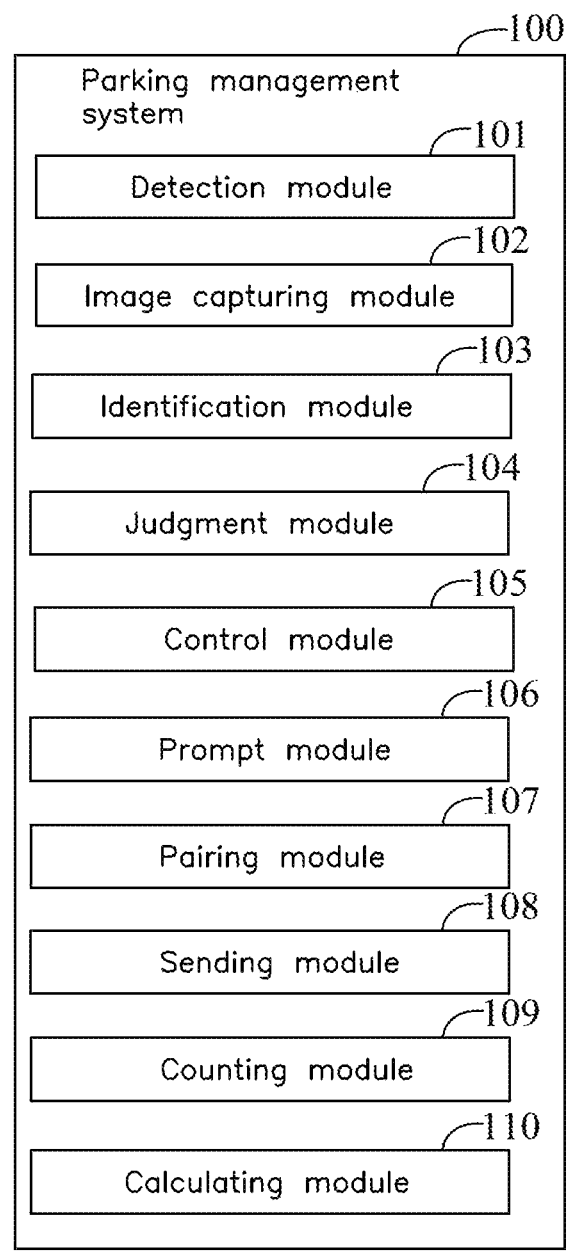
FIG. 4 is a schematic block diagram of function modules of a parking management system.

Exemplarily, the computer program 30 may include a parking management system 100 (shown in FIG. 4). The parking management system 100 may be divided into one or more modules, and the one or more modules are stored in the memory 20 and executed by the processor 10.

Those skilled in the art can understand that the schematic diagram is only an example of the parking management device 1 and does not constitute a limitation on the parking management device 1. It may include more or fewer components than shown in the figure, or combine certain components, or have different components, for example, the parking management device 1 may also include input and output devices, network access devices, buses, and so on.

The processor 10 may be a central processing unit, other general-purpose processors, digital signal processors, application-specific integrated circuits, a Field-Programmable Gate Array, or other programmable logic devices, discrete gates or transistor logic devices, discrete hardware components, etc. The general-purpose processor may be a microprocessor or the processor 10 may also be any conventional processor, etc. The processor 10 is a control center of the parking management device 1 and uses various interfaces and lines to connect various parts of the parking management device 1.

The memory 20 may be used to store the computer program 30 and/or modules. The processor 10 runs or executes the computer program 30 and/or modules stored in the memory 20 and calls the computer program and/or modules stored in the memory 20. The data in the memory 20 realizes various functions of the parking management device 1. The memory 20 may mainly include a program storage area and a data storage area. The program storage area may store an operating system, an application program required by at least one function (such as a sound playback function, an image playback function, etc.), or the like; the data (such as audio data, phone book, etc.) created according to the use of the parking management device 1 is stored. In addition, the memory 20 may include a high-speed random access memory, and may also include a non-volatile memory, such as a hard disk, a memory, a plug-in hard disk, a smart memory card, and a secure digital card, Flash Card, at least one magnetic disk storage device, flash memory device, or another volatile solid-state storage device.

The sensing unit 40 is an infrared sensor installed on the lifting mechanism 60 for detecting whether a vehicle is approaching the parking management device 1.

The camera unit 50 is a camera for taking images of the vehicle. In one embodiment, the camera unit 50 is also equipped with a flash (not shown), which is used to supplement light for taking pictures, so as to improve the shooting quality.

Figure 3:
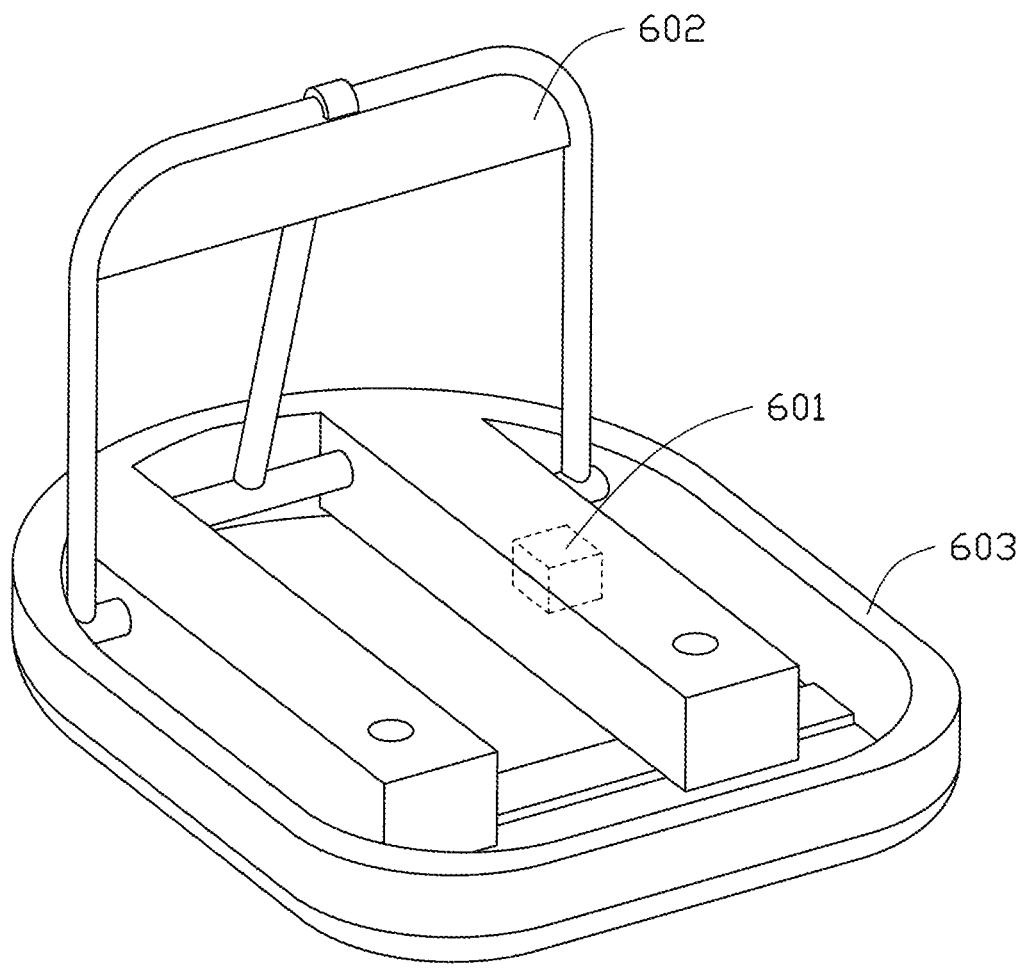
FIG. 3 is a schematic diagram of a lifting mechanism of the parking management device.

Referring to FIG. 3, the lifting mechanism 60 includes at least a motor 601, a blocking portion 602, and a base 603. In one embodiment, the motor 601 is installed in the base 603, and the blocking portion 602 is installed on the base 603. The base 603 defines a receiving space for receiving the blocking portion 602 when the blocking portion 602 is lowered. The motor 601 is used to raise or lower the blocking portion 602. The lifting mechanism 60 is installed in a parking space. When the blocking portion 602 is raised, a height of the blocking portion 602 is sufficient to prevent a vehicle from parking in the parking space. When the blocking portion 602 is lowered, the height of the blocking portion 602 is sufficient to allow a qualified vehicle to park in the parking space.

The first communication unit 70 is a wireless communication module. The mobile terminal 2 includes a second communication unit 201 (shown in FIG. 1), which is also a wireless communication module. The second communication unit 201 may be communicatively connected with the first communication unit 70 via a wireless network. In one embodiment, the wireless network is a cellular network.

Referring to FIG. 4, the computer program 30 can be divided into a detection module 101, an image capturing module 102, an identification module 103, a judgment module 104, a control module 105, a prompt module 106, a pairing module 107, a sending module 108, a timing module 109, and a calculating module 110.

The detection module 101 is used to detect whether a vehicle is approaching the parking management device 1 in the parking space.

In one embodiment, the detection module 101 detects whether a vehicle is approaching the parking management device 1 in a parking space through the sensing unit 40. Specifically, the sensing unit 40 emits infrared rays, and when the sensing unit 40 receives the reflected infrared rays, the detection module 101 detects that a vehicle is approaching the parking management device 1. When the sensing unit 40 does not receive the reflected infrared rays, the detection module 101 does not detect that a vehicle is approaching the parking management device 1.

In other embodiments, after the sensing unit 40 emits infrared rays and receives the reflected infrared rays, the detection module 101 further determines whether the reflected infrared rays are received for a preset time duration. When the sensing unit 40 receives the reflected infrared rays for the preset time duration, the detection module 101 determines that the vehicle is close to the parking management device 1. When the sensing unit 40 does not receive the reflected infrared rays for the preset time duration, the detection module 101 determines that the vehicle is not close to the parking management device 1. The preset time duration may be thirty seconds.

The image capturing module 102 is used to capture an image of the vehicle when it is detected that a vehicle is approaching the parking management device 1.

In one embodiment, the camera unit 50 is installed on the lifting mechanism 60. The camera module 102 controls the camera unit 50 to capture images of a front or rear of the vehicle. Specifically, when the front of the vehicle enters the parking space first, the camera unit 50 may capture an image of the front of the vehicle. When the rear of the vehicle enters the parking space first, the camera unit 50 may capture an image of the rear of the vehicle.

In other embodiments, the camera unit 50 may also be installed at an edge of the parking space. The camera module 102 controls the camera unit 50 to capture images of the front or rear of the vehicle.

In other embodiments, the parking management device 1 may include a plurality of camera units 50 which are installed on the lifting mechanism 60 and at the edge of the parking space. The camera module 102 controls the camera unit 50 to capture images of the front and rear of the vehicle.

The identification module 103 is used to identify feature information of the vehicle through the captured images.

In one embodiment, the feature information is appearance features of the vehicle. When the images captured by the camera unit 50 are images of the front of the vehicle, the appearance features may include whether the front of the vehicle is provided with an air intake rail. When the images captured by the camera unit 50 are images of the rear of the vehicle, the appearance features may include whether an exhaust pipe is provided at the rear of the vehicle. When the images captured by the camera unit 50 include images of the front and rear of the vehicle, the appearance features may include whether an air intake rail is provided at the front of the vehicle and whether an exhaust pipe is provided at the rear of the vehicle.

In another embodiment, the feature information is a license plate number of the vehicle. Specifically, the identification module 103 extracts a license plate image of the vehicle from the images captured by the camera unit 50. The identification module 103 may extract the license plate image of the vehicle from the image by means of feature recognition.

Specifically, the identification module 103 performs grayscale and binarization processing on the license plate image to distinguish a license plate background from characters, and segments the license plate image according to the characters in the license plate image. The identification module 103 performs horizontal jump point scanning and vertical pixel scanning on the license plate image, and then divides the license plate image according to the jump points in the horizontal direction and the pixels in the vertical direction to form multiple license plate sub-images, wherein each license plate sub-image contains a character, thereby separating the characters.

Specifically, the identification module 103 further normalizes each segmented license plate sub-image so that the size of each license plate sub-image is the same, and then extracts features of the characters in each license plate sub-image. The identification module 103 extracts the features of the characters in each license plate sub-image based on feature extraction methods such as stroke slope, inflection point amplitude, character outline, and character jump point.

Specifically, the identification module 103 identifies corresponding characters using a neural network model according to the extracted character features, and composes the recognized characters into a license plate number. In one embodiment, the neural network model has been trained in advance according to the features of Chinese characters, letters, and numbers.

In another embodiment, the feature information is a color of the license plate. The identification module 103 determines the color of the license plate according to the background color of the license plate image. The color of the license plate can be green, blue, yellow, black, or other color. In one embodiment, when the color of the license plate is green, the vehicle is an electric vehicle, and when the color of the license plate is not green, the vehicle is a non-electric vehicle.

The judgment module 104 is configured to determine whether the vehicle matches the parking space according to the feature information.

Specifically, the judgment module 104 determines the type of the vehicle according to the feature information, and determines whether the vehicle matches a preset type of vehicle allowed to be parked in the parking space. The type of vehicle may include electric vehicles and non-electric vehicles, and the preset type of vehicle allowed to park in the parking space is electric vehicles. That is, when the judgment module 104 determines that the type of vehicle is an electric vehicle according to the feature information, the type of the vehicle is determined to match the preset type allowed to be parked in the parking space.

In one embodiment, when the camera unit 50 captures images of the front of the vehicle and the front of the vehicle is not equipped with an air intake bar, the judgment module 104 determines that the type of the vehicle is an electric vehicle. When an air intake bar is provided at the front of the vehicle, the judgment module 104 determines that the type of the vehicle is a non-electric vehicle. When the camera unit 50 captures images of the rear of the vehicle and there is no exhaust pipe provided at the rear of the vehicle, the judgment module 104 determines that the type of the vehicle is an electric vehicle, and the type of the vehicle matches the preset type. When there is an exhaust pipe provided at the rear of the vehicle, the judgment module 104 determines that the type of the vehicle is a non-electric vehicle, and the type of the vehicle does not match the preset type.

In one embodiment, the server 3 includes a license plate database 301, and the license plate database 301 records a plurality of license plate numbers. The plurality of license plate numbers includes license plate numbers of electric vehicles. The judgment module 104 compares the license plate number of the vehicle with the plurality of license plate numbers in the license plate database 301 to determine whether the license plate database 301 stores the license plate number. In response that the license plate database 301 stores the license plate number, it is determined that the vehicle is an electric vehicle. In response that the license plate database 301 does not contain the license plate number, it is determined that the vehicle is a non-electric vehicle. When the judgment module 104 determines that the type of the vehicle is an electric vehicle, it is determined that the vehicle matches the preset type. When the judgment module 104 determines that the type of the vehicle is a non-electric vehicle, it is determined that the vehicle does not match the preset type.

In another embodiment, the judgment module 104 may determine whether the license plate number of the vehicle matches a preset license plate number allowed to be parked in the parking space. The license plate database 301 stores at least one license plate number corresponding to each parking space. The at least one license plate number is a license plate number allowed to be parked in the parking space. The judgment module 104 compares the license plate number of the vehicle with at least one license plate number allowed to be parked in the parking space in the license plate database 301 to determine whether the license plate number of the vehicle is allowed to be parked in the parking space. When the license plate number of the vehicle matches the at least one license plate number allowed to be parked in the parking space, it is determined that the license plate number of the vehicle is allowed to be parked in the parking space. When the license plate number of the vehicle does not match the at least one license plate number allowed to be parked in the parking space, it is determined that the license plate number of the vehicle is not allowed to be parked in the parking space.

The control module 105 is used for controlling the lifting mechanism 60 to change from a raised state to a lowered state when the judgment module 104 determines that the vehicle is allowed to be parked in the parking space.

In one embodiment, when there is no vehicle parked in the parking space, the blocking portion 602 is in the raised state. When the judgment module 104 determines that the vehicle is allowed to be parked in the parking space, the control module 105 sends a control instruction to the motor 601, and the motor 601 controls the blocking portion 602 to lower and be received in the base 603 in response to the control instruction. When the blocking portion 602 is in the lowered state, the vehicle can be parked in the parking space.

The prompt module 106 is configured to output first prompt information when the judgment module 104 determines that the vehicle does not match the parking space, so as to prompt that the vehicle cannot be parked in the parking space.

In one embodiment, the prompt module 106 controls a loudspeaker (not shown) to output the first prompt information through the loudspeaker. In other embodiments, the prompt module 106 may control an indicator light (not shown) to output the first prompt information through the indicator light.

The detection module 101 may further be used for detecting whether the vehicle is parked in a preset area of the parking space when the vehicle is turned off.

In one embodiment, the preset area is a rectangular area defined by white lines. A length and width of the preset area are adapted to the parking position of the vehicle, and are respectively larger than the length and width of the vehicle that is allowed to park in the parking space. The preset area includes four boundaries, which are a first boundary, a second boundary, a third boundary, and a fourth boundary. The sensing unit 40 is coupled to the first boundary, the second boundary, the third boundary, and the fourth boundary. Perpendicular distances of the boundaries includes a first distance, a second distance, a third distance, and a fourth distance.

In one embodiment, the parking management device 1 further includes a sound collection device (not shown) for collecting an engine sound of the vehicle in the parking space where the parking management device 1 is located. When the vehicle enters the parking space and the sound collection device does not collect the engine sound of the vehicle, the vehicle is turned off and parking is completed. The sensing unit 40 emits infrared rays in the directions of the four boundaries of the preset area to detect the distance between the sensing unit 40 and the edge of the vehicle in the directions of the four boundaries. The distance between the sensing unit 40 and the edge of the vehicle is a maximum distance between the sensing unit 40 and the vehicle body in the corresponding boundary direction.

In one embodiment, the detection module 101 respectively determines whether the distance between the sensing unit 40 and the edge of the vehicle in the directions of the four boundaries is greater than the perpendicular distance between the sensing unit 40 and the corresponding boundary. That is, the detection module 101 determines whether the distance between the sensing unit 40 and the edge of the vehicle in the direction of the first boundary is greater than the first distance, whether the distance between the sensing unit 40 and the edge of the vehicle in the direction of the second boundary is greater than the second distance, whether the distance between the sensing unit 40 and the edge of the vehicle in the direction of the third boundary is greater than the third distance, and whether the distance between the sensing unit 40 and the edge of the vehicle in the direction of the fourth boundary is greater than the fourth distance. When the detection module 101 determines that the distance between the sensing unit 40 and the edge of the vehicle in the direction of at least one boundary is greater than the perpendicular distance between the sensing unit 40 and the corresponding boundary, it is determined that the vehicle is not parked in the preset area of the parking space. When the detection module 101 determines that the distance between the sensing unit 40 and the edge of the vehicle in the directions of the four boundaries is less than or equal to the perpendicular distance between the sensing unit 40 and the corresponding boundary, it is determined that the vehicle is parked in the preset area of the parking space.

The prompt module 106 is further configured to output second prompt information when the detection module 101 detects that the vehicle is not parked in the preset area of the parking space.

In one embodiment, the prompt module 106 controls the speaker to output the second prompt information to prompt that the vehicle is not parked in the preset area.

The pairing module 107 is used to establish a pairing connection between the parking management device 1 and the mobile terminal 2 of the vehicle.

In one embodiment, when the vehicle is parked in the parking space, the first communication unit 70 of the parking management device 1 sends a pairing request, and when the second communication unit 201 of the mobile terminal 2 receives the pairing request, authentication information input into the mobile terminal 2 is sent to the first communication unit 70. When the first communication unit 70 determines that the authentication information is verified, a pairing connection between the parking management device 1 and the mobile terminal 2 is established.

The sending module 108 is configured to send distance and orientation information between the parking management device 1 and the mobile terminal 2 to the mobile terminal 2 in response to receiving a vehicle fetching instruction sent by the mobile terminal 2.

In one embodiment, when the mobile terminal 2 enters a parking lot or a parking area where the vehicle is parked, the vehicle fetching instruction can be sent through the second communication unit 201 of the mobile terminal 2, and the first communication unit 70 of the parking management device 1 receives a wireless signal corresponding to the vehicle fetching instruction. The sending module 108 determines the distance and orientation information between the parking management device 1 and the mobile terminal 2 according to the strength of the received wireless communication signal, and sends the distance and orientation information to the mobile terminal 2.

Specifically, the vehicle fetching instruction includes a command issuance time. The sending module 108 determines the distance information according to the time of the first communication unit 70 receiving the vehicle fetching instruction, the command issuance time included in the vehicle fetching instruction, and a propagation speed of the wireless signal. The sending module 108 further determines the position information according to the strength of the wireless communication signal. When the mobile terminal 2 receives the distance and orientation information, the mobile terminal 2 generates a navigation path between a current position of the mobile terminal 2 and the parking management device 1 according to the distance and orientation information, so as to facilitate finding the vehicle.

The detection module 101 is further used to detect whether the vehicle has left the parking space.

In one embodiment, when the vehicle is parked in the parking space, the sensing unit 40 continues to emit infrared rays. When the sensing unit 40 does not receive the reflected infrared rays, the detection module 101 detects that the vehicle has left the parking space. When the sensing unit 40 continues to receive the reflected infrared rays, the detection module 101 detects that the vehicle parked in the parking space has not left the parking space.

The control module 105 is further used for controlling the blocking portion 602 to return to the raised state when the detection module 101 detects that the vehicle has left the parking space.

In one embodiment, when the detection module 101 detects that the vehicle has left the parking space, the control module 105 sends a control command to the motor 601, and the motor 601 responds to the control command to raise the blocking portion 602, so as to prevent unauthorized vehicles from parking in the parking space.

The timing module 109 is used for timing a parking time of the vehicle in the parking space when the blocking portion 602 is changed from the raised state to the lowered state.

The calculation module 110 is used to calculate a parking fee of the vehicle according to the parking time of the vehicle in the parking space when the lifting mechanism 60 returns from the descending state to the raised state. The parking fee is the product of the parking time and an hourly parking fee.

The calculation module 110 is further used to collect the parking fee from a user account corresponding to the vehicle.

In one embodiment, the calculation module 110 collects the parking fee from the account of the user account through the server 3. Specifically, after the parking management device 1 establishes a pairing connection with the mobile terminal 2, the calculation module 110 sends the authentication information of the user account to the server 3, and the server 3 determines the user account according to the authentication information and collects the parking fee from the user account. The user account is an account dedicated to paying parking fees linked to the vehicle run by the server 3.

Figure 5:
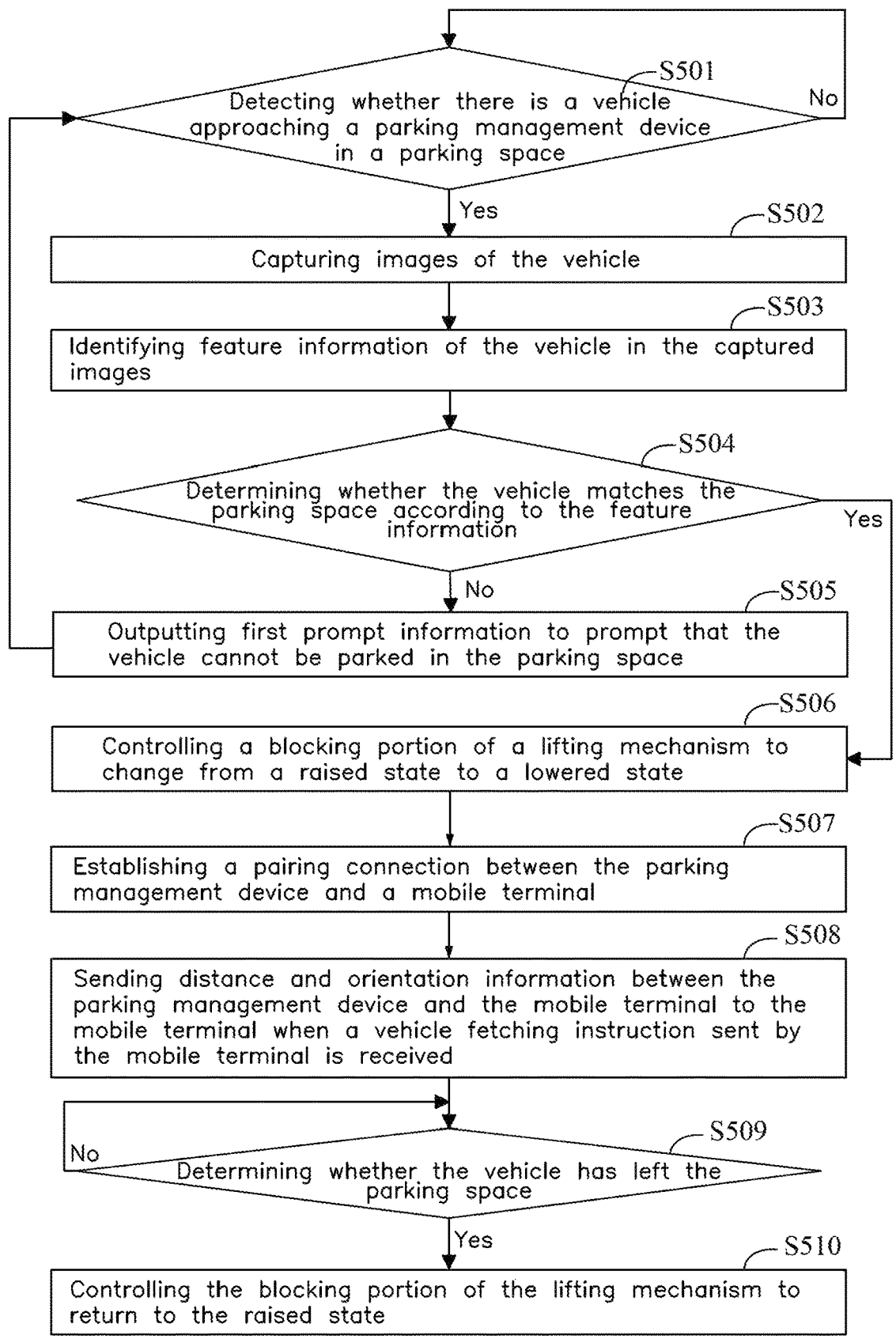
FIG. 5 is a flowchart of a parking management method.

FIG. 5 shows a flowchart of a parking management method provided by the present disclosure. According to different requirements, the order of blocks in the flowchart can be changed, and some blocks can be omitted or combined.

At block S501, whether a vehicle approaching the parking management device 1 in the parking space is detected. When a vehicle approaching the parking management device 1 is detected, block S502 is implemented. When no vehicle is detected, block S501 is repeated.

At block S502, images of the vehicle are captured.

At block S503, feature information of the vehicle is identified in the captured images.

At block S504, whether the vehicle matches the parking space according to the feature information is determined. When the vehicle matches the parking space, block S506 is implemented. When the vehicle does not match the parking space, block S505 is implemented.

At block S505, first prompt information is output to prompt that the vehicle cannot be parked in the parking space, and then block S501 is repeated.

At block S506, the blocking portion 602 of the lifting mechanism 60 is controlled to change from the raised state to the lowered state.

At block S507, a pairing connection is established between the parking management device 1 and the mobile terminal 2.

At block S508, when a vehicle fetching instruction sent by the mobile terminal 2 is received, the distance and orientation information between the parking management device 1 and the mobile terminal 2 is sent to the mobile terminal 2.

At block S509, whether the vehicle has left the parking space is determined. When it is determined that the vehicle has left the parking space, block S510 is repeated. When it is determined that the vehicle parked in the parking space has not left the parking space, block S509 is repeated.

At block S510, the blocking portion 602 of the lifting mechanism 60 is controlled to return to the raised state.

Further, when the vehicle is turned off, whether the vehicle is parked in a preset area of the parking space is detected. When it is detected that the vehicle is not parked in the preset area, second prompt information is output.

Further, when the blocking portion 602 of the lifting mechanism 60 changes to the lowered state, a parking time of the vehicle in the parking space is timed, and when the blocking portion 602 returns to the raised state, the parking fee of the vehicle is calculated according to the parking time of the vehicle in the parking space, and the parking fee is charged from the user account.

The parking management method and parking management device provided by the present disclosure identify the feature information of the vehicle to be parked by capturing pictures, and only allows a vehicle to park in the parking space when the feature information matches the parking space. Therefore, unauthorized vehicles are prevented from parking in the parking space.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A parking management method comprising:
    detecting whether there is a vehicle approaching a parking management device in a parking space;
    capturing images of the vehicle when the vehicle is detected approaching the parking management device;
    identifying feature information of the vehicle in the captured images;
    determining whether the vehicle matches the parking space according to the feature information;
    in response that the vehicle matches the parking space, controlling a lifting mechanism to change from a raised state to a lowered state;
    establishing a pairing connection between the parking management device and a mobile terminal; and
    in response to a received vehicle fetching instruction sent by the mobile terminal, sending distance and orientation information between the parking management device and the mobile terminal to the mobile terminal.

2. The parking management method of claim 1, further comprising:
    detecting whether the vehicle has left the parking space; and
    in response that the vehicle has left the parking space, controlling the lifting mechanism to return to the raised state.

3. The parking management method of claim 2, further comprising:
    when the lifting mechanism changes from the raised state to the lowered state, counting parking time of the vehicle in the parking space;
    when the lifting mechanism is returned to the raised state, calculating a parking fee of the vehicle according to the parking time; and
    charging the parking fee from a user account linked to the vehicle.

4. The parking management method of claim 1, wherein identifying the feature information of the vehicle in the captured images comprises:
    identifying appearance features of the vehicle in the captured images.

5. The parking management method of claim 4, wherein identifying the feature information of the vehicle in the captured images comprises:
    identifying a license plate number of the vehicle in the captured images.

6. The parking management method of claim 5, wherein determining whether the vehicle matches the parking space according to the feature information comprises:
    determining whether the license plate number is stored in a database, which stores a plurality of license plate numbers.

7. The parking management method of claim 6, wherein identifying the license plate number of the vehicle in the captured images comprises:
    extracting a license plate image of the vehicle from the images;
    performing grayscale and binarization processing on the license plate image;
    segmenting the license plate image according to characters in the license plate image into license plate sub-images;
    performing normalization processing on each of the license plate sub-images;
    extracting features of the characters in each of the license plate sub-images;
    identifying corresponding characters using a neural network model according to the extracted features; and
    composing the license plate number according to the identified characters.

8. The parking management method of claim 1, wherein sending the distance and the orientation information between the parking management device and the mobile terminal to the mobile terminal comprises:
    receiving, by the parking management device, wireless signals from the mobile terminal;

determining the distance and the orientation information between the parking management device and the mobile terminal according to a strength of the received wireless signals; and sending the distance and the orientation information to the mobile terminal.

9. The parking management method of claim 1, wherein the method further comprises:

when the vehicle is turned off, detecting whether the vehicle is parked in a preset area of the parking space; or when it is determined that the vehicle is not parked in the preset area of the parking space, outputting a prompt to the mobile terminal.

10. A parking management device comprising:

an image capturing unit;

a communication unit;

a sensing unit;

a lifting mechanism;

a processor; and a memory storing a plurality of instructions, which when executed by the processor, cause the processor to:

detect whether there is a vehicle approaching a parking management device in a parking space;

capture images of the vehicle when the vehicle is detected approaching the parking management device;

identify feature information of the vehicle in the captured images;

determine whether the vehicle matches the parking space according to the feature information;

in response that the vehicle matches the parking space, control a lifting mechanism to change from a raised state to a lowered state;

establish a pairing connection between the parking management device and a mobile terminal; and in response to a received vehicle fetching instruction sent by the mobile terminal, send distance and orientation information between the parking management device and the mobile terminal to the mobile terminal.

11. The parking management device of claim 10, wherein the processor is further caused to:

detect whether the vehicle has left the parking space; and in response that the vehicle has left the parking space, control the lifting mechanism to return to the raised state.

12. The parking management device of claim 11, wherein the processor is further caused to:

when the lifting mechanism changes from the raised state to the lowered state, count parking time of the vehicle in the parking space;

when the lifting mechanism is returned to the raised state, calculate a parking fee of the vehicle according to the parking time; and charge the parking fee from a user account linked to the vehicle.

13. The parking management device of claim 10, wherein the processor identifies the feature information of the vehicle in the captured images by:

identifying appearance features of the vehicle in the captured images.

14. The parking management device of claim 13, wherein the processor identifies the feature information of the vehicle in the captured images by:

identifying a license plate number of the vehicle in the captured images.

15. The parking management device of claim 14, wherein the processor determines whether the vehicle matches the parking space according to the feature information by:

determining whether the license plate number is stored in a database, which stores a plurality of license plate numbers.

16. The parking management device of claim 15, wherein the processor identifies the license plate number of the vehicle in the captured images by:

extracting a license plate image of the vehicle from the images;

performing grayscale and binarization processing on the license plate image;

segmenting the license plate image according to characters in the license plate image into license plate sub-images;

performing normalization processing on each of the license plate sub-images;

extracting features of the characters in each of the license plate sub-images;

identifying corresponding characters using a neural network model according to the extracted features; and composing the license plate number according to the identified characters.

17. The parking management device of claim 10, wherein the processor sends the distance and orientation information between the parking management device and the mobile terminal to the mobile terminal by:

receiving, by the parking management device, wireless signals from the mobile terminal;

determining the distance and orientation information between the parking management device and the mobile terminal according to a strength of the received wireless signals; and sending the distance and orientation information to the mobile terminal.

18. The parking management device of claim 10, wherein the processor is further configured to:

when the vehicle is turned off, detect whether the vehicle is parked in a preset area of the parking space; or when it is determined that the vehicle is not parked in the preset area of the parking space, output a prompt to the mobile terminal.

* * * * *